(12) United States Patent
Hicks et al.

(10) Patent No.: US 7,029,048 B1
(45) Date of Patent: Apr. 18, 2006

(54) MODULAR CONSOLE SYSTEM

(75) Inventors: Thomas S. Hicks, Livonia, MI (US);
James A. Mulvihill, Royal Oak, MI (US); Won-Tai Kim, Macomb, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/905,343

(22) Filed: Dec. 29, 2004

(51) Int. Cl.
*B60R 7/00* (2006.01)

(52) U.S. Cl. .............................. 296/24.34; 296/193.04; 296/37.1

(58) Field of Classification Search ............. 296/24.34, 296/193.04, 37.1, 37.8, 1.07, 37.7
See application file for complete search history.

(56) References Cited

U.S. PATENT DOCUMENTS

| | | | | |
|---|---|---|---|---|
| 5,085,481 A | * | 2/1992 | Fluharty et al. | 296/37.8 |
| 5,112,094 A | * | 5/1992 | Kribs | 296/37.8 |
| 5,492,068 A | * | 2/1996 | McKee | 296/37.8 |
| 6,086,129 A | * | 7/2000 | Gray | 296/37.8 |
| 6,264,261 B1 | * | 7/2001 | Krafcik | 296/37.8 |
| 6,367,857 B1 | | 4/2002 | Kifer et al. | |
| 6,497,443 B1 | | 12/2002 | Worrell et al. | |
| 2001/0030435 A1 | | 10/2001 | Burns et al. | |
| 2001/0030436 A1 | | 10/2001 | Kifer et al. | |
| 2002/0175531 A1 | | 11/2002 | Worrell et al. | |
| 2003/0122392 A1 | | 7/2003 | Larsen et al. | |
| 2003/0155786 A1 | * | 8/2003 | Kim et al. | 296/24.1 |
| 2003/0234550 A1 | * | 12/2003 | Brooks et al. | 296/24.1 |

* cited by examiner

*Primary Examiner*—Jason Morrow
(74) *Attorney, Agent, or Firm*—Brooks Kushman P.C.

(57) ABSTRACT

A modular console system for a vehicle includes a common module which defines a module space. The common module can be attached at different points along the length of a base, which is attached to the vehicle floor. The common module is configured to receive an insert module, which has an inner portion that is specifically configured to conform to one or more accessories that can be accessed by the vehicle occupants.

18 Claims, 3 Drawing Sheets

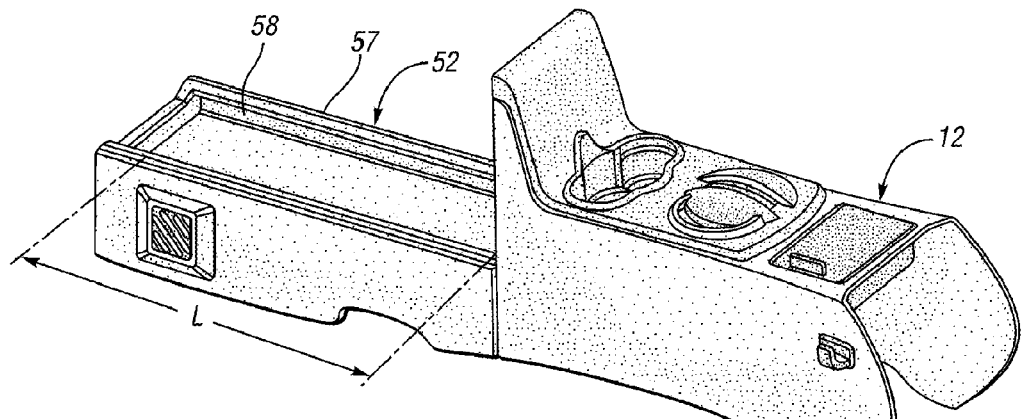
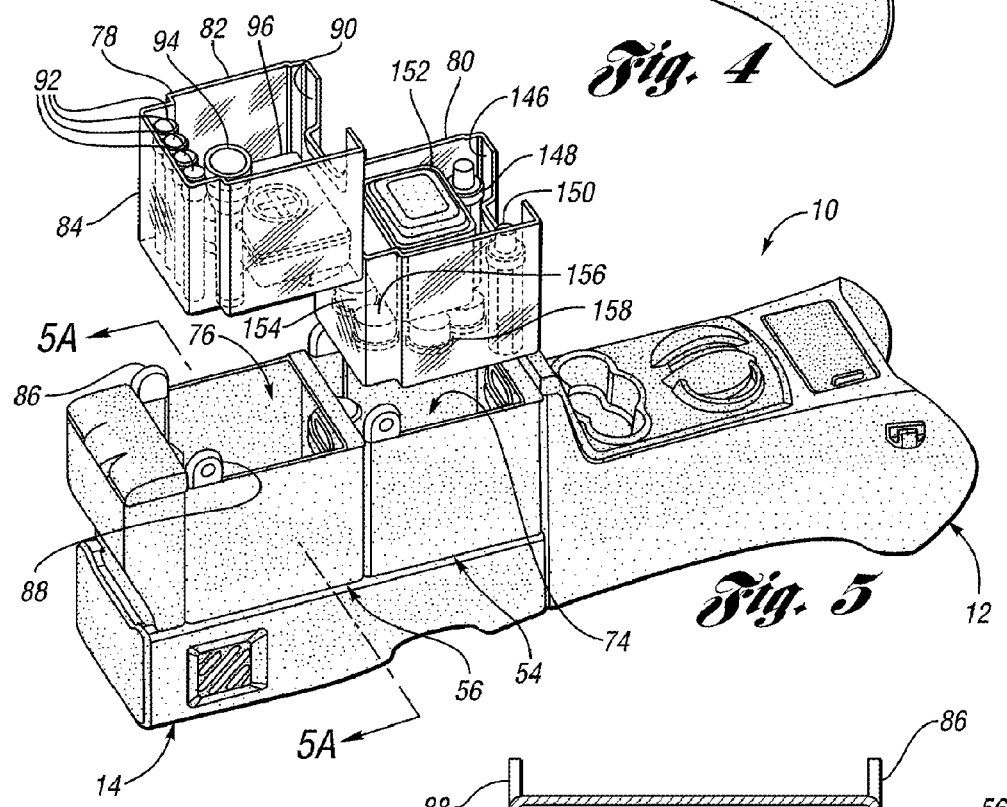
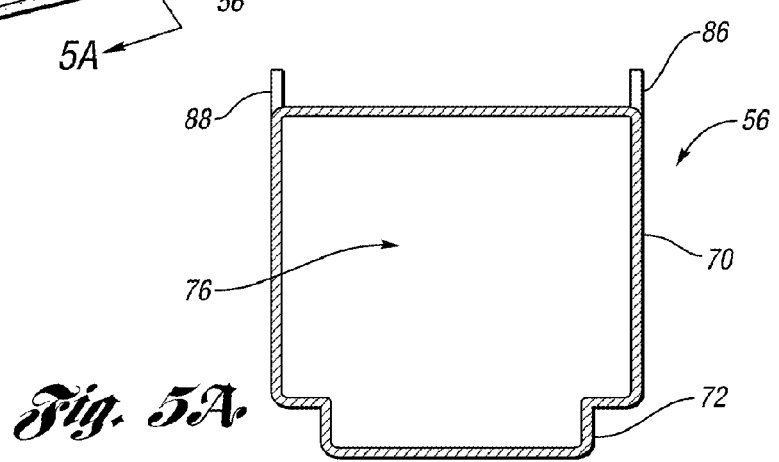

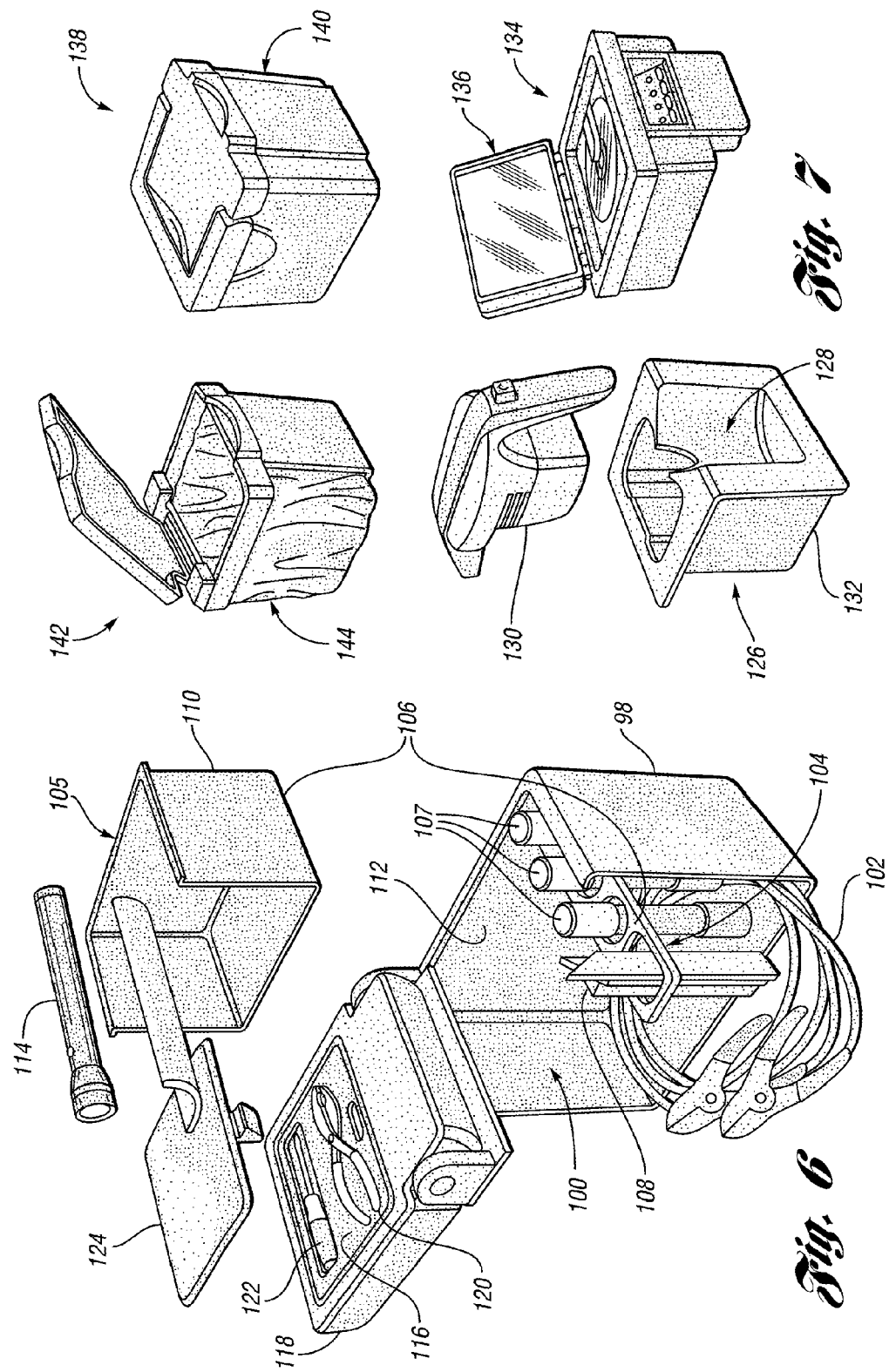

MODULAR CONSOLE SYSTEM

BACKGROUND OF THE INVENTION

1. Field of the Invention

The present invention relates to a modular console system.

2. Background Art

Vehicles today are increasingly designed to carry a wide variety of cargo. In addition to carrying large items which may be stored in a rearward portion of the vehicle, passenger compartments are also configured to carry, and provide access to, a wide variety of accessories, including entertainment devices and area-specific environmental controls. In addition, vehicle consoles often provide empty space that can be used to store a variety of different items.

One limitation of many of these designs is that the vehicle console is a static structure—i.e., the vehicle occupant must accept the configuration of the console, and cannot tailor it to his or her specific needs. One attempt to address this issue is described in U.S. Pat. No. 6,497,443 issued to Worrell et al. on Dec. 24, 2002. Worrell et al. describes a reconfigurable console for a vehicle that includes an upper portion that can be removed from a base portion and carried outside the vehicle. The removable portion of the console includes storage space that can be used to stow any number of different items. One limitation of the console described in Worrell et al. is that the upper portion is mounted to the base portion in the same location each time. That is, the upper portion cannot be mounted to the base at different locations to provide easier access for the vehicle occupants. Moreover, the storage space provided in the upper portion is not specifically configured to conform to any one type of accessory. Therefore, a stowed item within the upper portion may be too small for the given amount of space and may be displaced when the vehicle is in motion.

Therefore, a need exists for a modular console system that provides modules which can be mounted to a base at different locations along the base to provide convenient access to the vehicle occupants.

SUMMARY OF THE INVENTION

Accordingly, the present invention provides a modular console system that includes modules that can be attached to a base at different locations.

The invention also provides a modular console system that includes a number of secondary modules which conform to a particular accessory, and can be placed within the module attached to the base.

The invention further provides a modular console system for a vehicle, including a base and a first module configured for selective attachment to the base and defining a module space. A second module is configured for selective insertion into, and removal from, the module space. The second module defines a receiving area generally conforming to at least one accessory.

The invention also provides a modular console system for a vehicle having a passenger compartment. The system includes a base configured for attachment to the vehicle in the passenger compartment, and the base includes a recess disposed along at least a portion of its length. A first module defines a module space and includes upper and lower portions. The lower portion is configured for insertion into the recess in the base. A second module has an outer portion configured for insertion into the module space, and an inner portion, at least a portion of which generally conforms to at least one accessory.

The invention further provides a modular console system for a vehicle include a front seat, a center console adjacent the front seat, and a second row seat. The system includes a first module defining a module space. A support structure is configured for attachment to the vehicle rearward the center console such that at least a portion of the support structure is accessible by a vehicle occupant seated in the second row seat. The support structure is further configured to receive the first module in a location accessible by a seated occupant. A second module is configured for insertion into, and removal from, the module space. The second module defines a receiving area generally conforming to at least one accessory.

BRIEF DESCRIPTION OF THE DRAWINGS

FIG. 4 is a perspective view of a portion of the vehicle console shown in FIG. 1;

FIG. 5 is a perspective view of the vehicle console shown in FIG. 1, including a pair of insert modules configured for insertion into the common modules of the modular console system of the present invention;

FIG. 5A is a cross-sectional view of the vehicle console shown in FIG. 5, taken through line 5A—5A;

FIG. 6 is a fragmentary perspective view of one insert module that can be used with the present invention; and FIG. 7 is a perspective view of a number of different insert modules that can be used with the present invention.

DETAILED DESCRIPTION OF THE PREFERRED EMBODIMENT(S)

Figure 1:
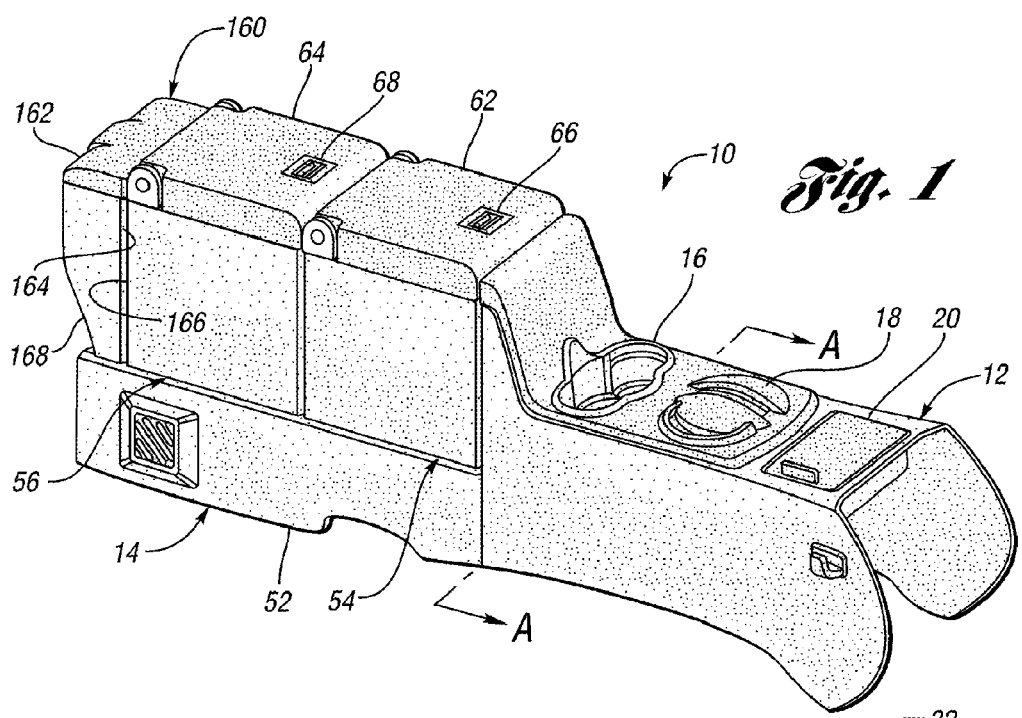
FIG. 1 is a perspective view of a vehicle console, including a modular console system of the present invention.

FIG. 1 shows a vehicle console 10 that includes a center console 12, which is shown to the right of line A—A in FIG. 1, and a modular console system 14, shown to the left of line A—A. The center console 12 shown in FIG. 1 includes a cup holder 16, a cutout 18 for a gearshift (not shown), and a covered storage tray 20. Center consoles having features similar to the center console 12 are commonly found in different types of vehicles today.

Figures 2, 3:
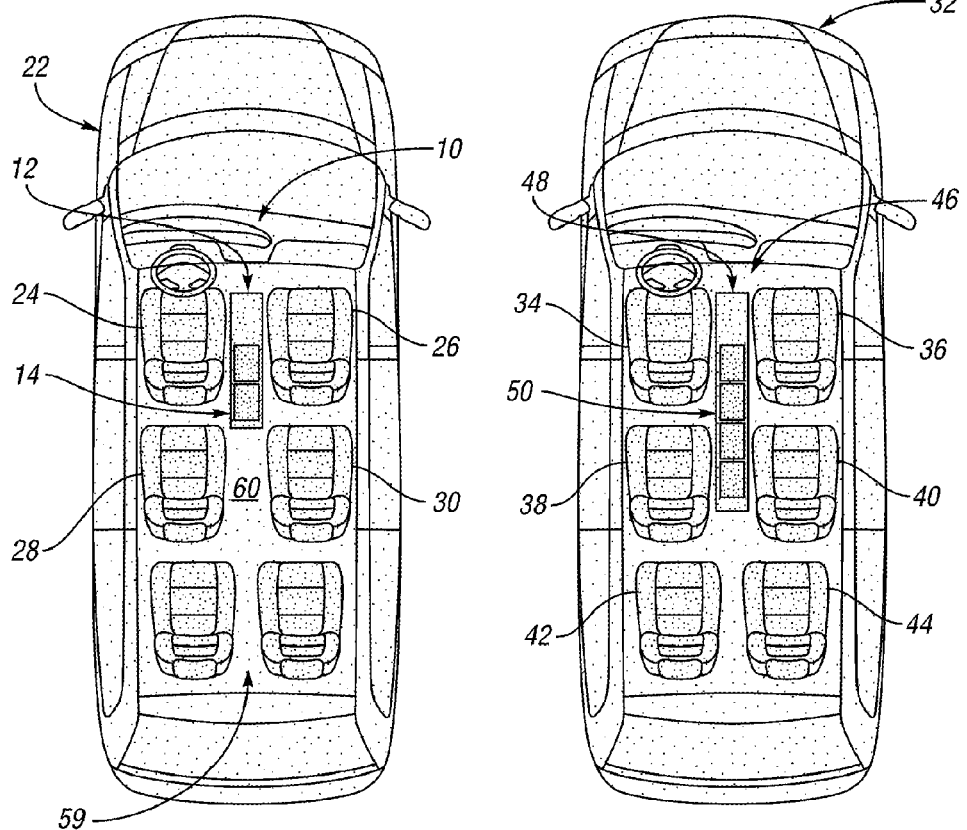
FIG. 2 is a top plan view of a portion of a vehicle including the vehicle console shown in FIG. 1.
FIG. 3 is a top plan view of a portion of a vehicle, including an alternative embodiment of the vehicle console shown in FIG. 1.

As explained in detail below, the module console system 14 of the present invention provides a number of advantages over other types of vehicle console systems. FIG. 2 shows the vehicle console 10, including the center console 12 and the modular console system 14, mounted in a vehicle 22. As oriented in the vehicle 22, the modular console system 14 is behind the center console 12. In the embodiment shown in FIG. 2, the center console 12, and a portion of the modular console system 14, are intended to be accessible to a vehicle occupant seated in either of two first row seats 24, 26. Also shown in FIG. 2, a portion of the module console system 14 is configured to be accessible by a vehicle occupant seated in either of two second row seats 28, 30.

The embodiment illustrated in FIG. 2 represents just one possible configuration for a modular console system, such as the modular console system 14. For example, FIG. 3 shows a portion of a vehicle 32, having first row seats 34, 36, second row seats 38, 40, and third row seats 42, 44. The vehicle 32 also contains a vehicle console 46 that includes a center console 48 and a modular console system 50. By extending the modular console system 50 rearward, a portion of it will be accessible by an occupant seating in either of the third row seats 42, 44. This configuration may be particularly beneficial in larger sport utility vehicles (SUV's) and vans, where third row passengers often have little or no access to a console system.

Returning to FIG. 1, it is shown that the modular console system 14 includes a support structure, or base 52, and a pair of first modules, or common modules 54, 56. Although they are assigned different numerical labels, the common modules 54, 56 are configured the same, and may be interchanged. The common modules 54, 56 are configured for selective attachment to the base 52, as explained in conjunction with FIGS. 4 and 5. Also shown in FIG. 1, the common modules 54, 56 are respectively covered by pivoting lids 62, 64. The lids 62, 64 have respective latches 66, 68 to facilitate opening of the lids 62, 64, which pivot upward to provide access to the inside of the common modules 54, 56.

FIG. 4 shows the center console 12 and the base 52 without the common modules 54, 56 installed. The base 52 has an elongate portion 57, which includes a recess 58 disposed along a length (L) of the base 52. In the embodiment shown in FIG. 4, the length (L) of the recess traverses almost the entire base 52; in other embodiments, it may be shorter or longer as desired. The base 52 can be secured in the vehicle by direct attachment to the center console 12. Alternatively, the base 52 can be attached to other structures in a passenger compartment 59 of the vehicle 22—see FIG. 2. For example, the base 52 can be attached directly to a floor 60 of the vehicle 22, or alternatively, attached to the floor 60 and the center console 12.

FIG. 5 shows the vehicle console 10, including the center console 12 and the modular console system 14. In FIG. 5, the lids 62, 64 of the common modules 54, 56 have been removed for clarity. To illustrate how the common modules 54, 56 cooperate with the base 52, the common module 56 has been cut through line 5A—5A; the resulting cross-section of the common module 56 is shown in FIG. 5A. FIG. 5A shows that the common module 56 includes an upper portion 70 and a lower portion 72. The lower portion 72 is configured for insertion into the recess 58 of the base 52. The actual attachment of a common module, such as the common module 56, to the base 52, can be effected in any of a number of ways. For example, the lower portion 72 of the common module 56 can be sized to provide an interference fit as it is inserted into the recess 58 of the base 52. Alternatively, any device or mechanism can be used that is effective to secure the common module 56 to the base 52.

In one embodiment, the lower portion 72 of the common module 56 and the base 52 can be configured with mating elements that are either molded directly into the respective console components, or attached thereto in a secondary operation. For example, at least some of the lower portion 72 of the common module 56 can be covered with one portion of a hook and loop fastening system, while at least a portion of the recess 58 in the base 52 is covered with the mating portion of the hook and loop fastening system. Alternatively, the lower portion 72 of the common module 56 can be configured with a latch mechanism that mates with the base 52 at various locations along the length (L) of the recess 58. In any case, it may be convenient to provide an attachment mechanism for the common module 56 to the base 52 that allows the common module 56 to be attached at any of a number of different locations along the length (L). This allows flexibility with regard to positioning the common module 56, and provides convenience for the vehicle occupants.

In FIG. 5, it is shown that each of the common modules 54, 56 defines a respective module space 74, 76. Either or both of the modules spaces 74, 76 can be used as storage by a vehicle occupant. Alternatively, the present invention contemplates the use of second modules, or insert modules 78, 80. As explained below, the insert modules 78, 80, shown in FIG. 5, illustrate just two embodiments of the many different types of insert modules that can be used with the modular console system 14.

In general, each of the insert modules are configured for selective insertion into, and removal from, either module space 74, 76. In addition, it is worth noting that in embodiments of the modular console system having more than one common module, such as the embodiments shown in FIGS. 2 and 3, each of the insert modules can be inserted into, and removed from, each of the respective module spaces defined by each of the common modules. This provides tremendous flexibility in the configuration and arrangement of the various modules, thereby giving vehicle occupants a wide variety of options.

Using the insert module 78 as an example, FIG. 5 shows that the insert module 78 includes an outer portion 82 that is configured for insertion into the module space 76. The outer portion 82 of the insert module 78 narrows near its back 84 so as to accommodate hinges 86, 88 attached to the common module 56. Because of this configuration, the insert module 78 is held fast within the module space 76 of the common module 56, and is not subject to a large amount of movement which could cause undesirable vibration and noise when the vehicle is moving. In addition to the outer portion 82, the insert module 78 also has an inner portion 90, at least some of which generally conforms to one or more accessories which may be used by a vehicle occupant. The part or parts of the inner portion 90 of the insert module 78 that generally conforms to one or more accessories, may be called a receiving area or areas, since this portion of the insert module 78 is specifically configured to receive one or more corresponding accessories. In the embodiment shown in FIG. 5, the insert module 78 is specifically configured to conform to items that may be used in an emergency—e.g., flares 92, a flashlight 94, and a first aid kit 90. Thus, the insert module 78 can be considered one type of emergency kit module that may be placed in any of the common modules present within the modular console system 14, or alternatively, may be removed in place of another insert module.

FIG. 6 shows an exploded view of an alternative embodiment of a common module and an insert module. In particular, FIG. 6 shows a cutaway portion of a common module 98, which can be used with a base, such as the base 52. The common module 98 defines a module space 100 that can be used for general storage, such as to store jumper cables 102. In addition to the general storage, the common module 98 has been fitted with first and second portions 104, 105 of an insert module 106. Like the insert module 78, the insert module 106 generally conforms to a number of accessories. For example, the first portion 104 of the insert module 106 generally conforms to flares 107 and an emergency triangle 108. Moreover, it is contemplated that the common module 98 would be able to receive the insert module 78, just as the common module 56 would be able to receive the insert module 106.

In the embodiment shown in FIG. 6, the second portion 105 of the insert module 106 is configured for insertion into the module space 100, similar to the way that the insert module 78 is configured for insertion into the module space 76. For example, the second portion 105 of the insert module 106 includes an outer contour 110 that cooperates with a portion of an inner contour 112 of the common module 98. The second portion 105 of the insert module 106 is also configured to generally conform to an accessory, in this case a flashlight 114. The embodiment shown in FIG. 6 also includes additional storage, in the form of a conforming insert 116 which is held by a lid 118 that covers the common module 98. As an adjunct to the emergency accessories contained in the first and second portions 104, 105 of the insert module, the conforming insert 116 contains pliers 120 and a screwdriver 122. A lid 124 snaps in place over the conforming insert 116 to keep the tools in place when the lid 118 is closed.

FIG. 7 illustrates a number of other insert modules that can be used with a common module, such as the common modules 56 and 98. Insert module 126 includes an inner portion 128 that generally conforms to a vacuum cleaner 130. The insert module 126 also has an outer portion 132 that is configured to be received by a module space, such as the module space 76 or the module space 100. Similarly, insert module 134 is configured to conform to an entertainment system 136, insert module 138 is configured to conform to a cooler 140, and insert module 142 is configured to conform to a trash receptacle 144. Each of the insert modules 134, 138, 142, are also configured for insertion into a module space, such as the module space 76 or the module space 100, shown in FIGS. 5 and 6, respectively.

Returning to FIG. 5, it is shown that the insert module 80 is configured to conform to accessories specifically designed for infant care. For example, an inner portion 146 of the insert module 80 contains features which conform to baby bottles 148, 150, a container of baby wipes 152, and even a number of jars of baby food 154, 156, 158. Thus, the insert modules of the present invention may be configured to facilitate specific tasks, such as carrying an emergency kit, an infant assist kit, a cooler, an entertainment system, or even cleaning supplies and accessories, just to name a few.

Returning to FIG. 1, it is shown that the modular console system 14 includes a third module, or rear bin 160. The rear bin 160 also contains storage space (not shown) under a lid 162. In addition to providing additional storage space, the rear bin 160 can contain functional items such as those contained in the insert modules, and in fact, may include a set of controls for an electronic system such as an audio/video system, or a rear heating, ventilation, and air conditioning (HVAC) system. Moreover, the rear bin 160 may also provide a trash receptacle having a removable liner. The rear bin 160 includes a generally flat surface 164 that is configured to abut a generally flat surface 166 on the common module 56. The rear bin 160 also includes a generally curved surface 168 which faces a rear portion of the vehicle, and provides an aesthetic and finished appearance to the module console system 14. Thus, the module console system 14 provides convenience and flexibility by allowing common modules to be placed in different locations along a base, and additional flexibility through the use of insert modules which conform to specific accessories that can be used by the vehicle occupants.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A modular console system for a vehicle, the system comprising:
    a base;
    a first module defining a module space and configured for selective attachment to the base at any of a plurality of locations along a length of the base; and
    a second module configured for selective insertion into, and removal from, the module space, the second module defining a receiving area generally conforming to at least one accessory.

2. The modular console system of claim 1, further comprising a plurality of second modules, each of the second modules being configured for selective insertion into, and removal from, the module space, and each of the second modules defining a receiving area generally conforming to at least one accessory.

3. The modular console system of claim 2, further comprising at least one additional first module, each of the first modules being configured for selective attachment to the base, and each of the first modules defining a module space configured to receive any of the second modules.

4. The modular console system of claim 1, further comprising a third module configured for selective attachment to the base, the third module including a generally flat surface configured to abut a corresponding generally flat surface on the first module, the third module also including a generally curved surface disposed on a side of the third module opposite the generally flat surface, the generally curved surface facing a rear portion of the vehicle and providing an aesthetic appearance to the console system.

5. The modular console system of claim 1, wherein the receiving area defined by the second module generally conforms to at least one accessory from the following set of accessories: an emergency kit, a vacuum cleaner, a cooler, a trash receptacle, and an entertainment system.

6. A modular console system for a vehicle having a passenger compartment, the system comprising:
    a base configured for attachment to the vehicle in the passenger compartment, the base including a recess disposed along a length of the base;
    a first module defining a module space and including upper and lower portions, the lower portion being configured for insertion into the recess in the base; and
    a second module having an outer portion configured for insertion into the module space and an inner portion, at least a portion of which generally conforms to at least one accessory.

7. The modular console system of claim 6, further comprising a plurality of second modules, each of the second modules having an outer portion configured for insertion into the module space and an inner portion generally conforming to at least one accessory.

8. The modular console system of claim 7, further comprising at least one additional first module, each of the first modules including upper and lower portions, each of the lower portions being configured for insertion into the recess in the base, and each of the first modules defining a module space configured to receive any of the second modules.

9. The modular console system of claim 8, wherein the lower portion of each of the first modules is configured for insertion into the base at any of a plurality of locations.

10. The modular console system of claim 6, further comprising a third module including upper and lower portions, a generally flat surface configured to abut a corresponding generally flat surface on the first module, and a generally curved surface disposed on a side of the third module opposite the generally flat surface and facing a rear portion of the vehicle, the lower portion of the third module being configured for insertion into the recess in the base.

11. The modular console system of claim 6, wherein the inner portion of the second module generally conforms to at least one accessory from the following set of accessories: an emergency kit, a vacuum cleaner, a cooler, a trash receptacle, and an entertainment system.

12. A modular console system for a vehicle including a first row seat, a center console adjacent the front seat, and a second row seat, the system comprising:
  a first module defining a module space;
  a support structure configured for attachment to the vehicle rearward the center console such that at least a portion of the support structure is accessible by a vehicle occupant seated in the second row seat, the support structure being further configured to receive the first module in a location accessible by a seated occupant; and
  a second module configured for insertion into, and removal from, the module space, the second module defining a receiving area generally conforming to at least one accessory.

13. The modular console system of claim 12, wherein the support structure includes an elongate portion defining a recess configured to receive the first module at any of a plurality of locations, at least one of the locations being accessible by a vehicle occupant seated in the first row seat, and at least one of the locations being accessible by a vehicle occupant seated in the second row seat.

14. The modular console system of claim 13, further comprising a third module configured for insertion into the recess rearward and adjacent the first module.

15. The modular console system of claim 12, wherein the support structure is configured for attachment to a floor of the vehicle.

16. The modular console system of claim 12, wherein the first module includes an inner contour at least partly defining the module space, and the second module includes an outer contour configured to cooperate with at least a portion of the inner contour of the first module to secure the second module within the module space.

17. The modular console system of claim 16, further comprising a plurality of second modules, each of the second modules including an outer contour configured to cooperate with at least a portion of the inner contour of the first module to secure the respective second module within the module space, and each of the second modules defining a receiving area generally conforming to at least one accessory.

18. The modular console system of claim 17, further comprising at least one additional first module, each of the first modules being configured to be received by the support structure and defining a module space configured to receive any of the second modules.

\* \* \* \* \*